(12) United States Patent
Sumida et al.

(10) Patent No.: US 8,010,231 B2
(45) Date of Patent: Aug. 30, 2011

(54) COMMUNICATION ROBOT

(75) Inventors: Naoaki Sumida, Saitama (JP); Takahiro Ariizumi, Saitama (JP); Sachie Hashimoto, Saitama (JP); Yuichi Yoshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/315,833

(22) Filed: Dec. 5, 2008

(65) Prior Publication Data

US 2009/0149991 A1 Jun. 11, 2009

(30) Foreign Application Priority Data

Dec. 6, 2007 (JP) ................................. 2007-316234

(51) Int. Cl.
*G05B 19/04* (2006.01)
(52) U.S. Cl. ........................... 700/253; 700/258; 901/46
(58) Field of Classification Search .................. 700/245, 700/253, 250, 258; 446/268; 901/1, 46, 901/50; 318/568.12, 568.23
See application file for complete search history.

(56) References Cited

U.S. PATENT DOCUMENTS

| 6,401,846 | B1 | 6/2002 | Takenaka et al. |
| 6,711,467 | B2 * | 3/2004 | Inoue et al. ................... 700/245 |
| 7,071,648 | B2 * | 7/2006 | Tsurumi ................. 318/568.12 |
| 2006/0126918 | A1 | 6/2006 | Oohashi et al. |
| 2006/0129276 | A1 | 6/2006 | Watabe et al. |

FOREIGN PATENT DOCUMENTS

| JP | 2001-062760 (A) | 3/2001 |
| JP | 2001-179666 A | 7/2001 |
| JP | 2001179666 A * | 7/2001 |
| JP | 2002-178282 A | 6/2002 |
| JP | 2003-205179 A | 7/2003 |
| JP | 2004-283958 | 10/2004 |
| JP | 2006-167844 (A) | 6/2006 |
| JP | 2006-192563 (A) | 7/2006 |

OTHER PUBLICATIONS

F. Michaud et al.: "Spartacus attending the 2005 AAAI Conference", Autonomous Robots, vol. 22, No. 4; Dec. 27, 2006, pp. 369-383, XP019477658, * sections 1, 2, "References".

(Continued)

*Primary Examiner* — Thomas Black
*Assistant Examiner* — Sara Lewandroski
(74) *Attorney, Agent, or Firm* — Carrier Blackman & Associates, P.C.; Joseph P. Carrier; William D. Blackman

(57) ABSTRACT

A communication robot including: a situation change detection unit for detecting writing of information into a situation database; a rule detection unit for detecting, from a rule database, a rule corresponding to the situation indicated by the data stored in the situation database when the writing of information into the situation database is detected by the situation change detection unit; an action inducing parameter setting unit for setting the degree of interest of the detected rule to at least one of movable parts and an audio output unit independently in the situation database; a parameter changing unit for independently changing the degree of interest set for the at least one of the movable parts and the audio output unit; and a command unit for requesting the at least one of the movable parts and the audio output unit to execute the execution command indicated by the detected rule.

8 Claims, 15 Drawing Sheets

OTHER PUBLICATIONS

F. Michaud: "EMIB;—Computational Architecture Based on Emotion and Motivation for Intentional Selection and Configuration of Behaviour-Producing Modules"; Cognitive Science Quarterly (reprint), vol. 2, No. 3/4 (Fall/Winter 2002), XP002586088, Retrieved from the Internet: URL: http://www.gel.usherbrooke.ca/laborius/papers/CS2002.pdf, * section "EMIB computational architecture" *, * section "References"; figure 3.

A. Stoytchev, R. C. Arkin: "Incorporating Motivation in a Hybrid Robot Architecture"; Journal of Advanced Computational Intelligence and Intelligent Informatics (reprint); vol. 8, No. 3 (May 2004), Jun. 9, 2004, XP002586089 Retrieved from the Internet: URL:http://www.ece.iastate.ed/{alexs/papers/JACI_2004/JACI_2004.pdf; * section 2, appendix A *, * sections 3.3, 4.2, 4.3.

B. Adams, C. Breazeal, R. A. Brooks B. Scassellati: "Humanoidrobots: A New Kind of Tool"; IEEE Intelligent Systems, vol. 15, No. 4, Aug. 3, 2000, pp. 25-31, XP001083403, * figure 2.

J. Mukai, M. Imai: "Maintenance and Drift of Attention in Human-Robot Communication"; Workshop on Multi-Agent Robotic Systems (MARS) of the 2nd International Conference on Informatics in Control, Automation and Robotics (ICINCO'05), Sep. 13, 2005, XP002586090, Retrieved from the Internet URL:http://www.ayu.ics.keio.ac.jp/achieve/pdf/2005/W1_667_Mukai.pdf, * sections 1,2.

A. Matsikis: "Bildgestuetztes Teach-In Eines Mobilen Manipulators in Einer Virtuellen Umgebung", Jan. 21, 2005, Rheinisch-Westfaelische Technische Hochschule (RWTH) Aachen, XP002586091, * chapter 2.

* cited by examiner

FIG. 4

| TASK ID | PRIORITY | IMPORTANCE | ROBOT ID | CONTENT | START POINT | END POINT | REQUIRED TIME | START TIME | END TIME | STATUS |
|---|---|---|---|---|---|---|---|---|---|---|
| 1 | | 1 | | GUIDE | www, xxx, yyy | ooo, ppp, qqq | 3 | 10:27 | 10:30 | END |
| 2 | | 3 | | GUIDE | | | 5 | 10:40 | 10:45 | STANBY |
| 3 | | 2 | | TRANSPORT | | | 10 | 10:45 | 10:55 | RESERVED |
| 4 | | 4 | | GUIDE | | | 5 | 10:45 | 10:50 | RESERVED |
| ... | ... | ... | ... | ... | ... | ... | ... | ... | ... | ... |
| 10 | | 3 | | TRANSPORT | 000, 000, 000 | xxx, yyy, zzz | 5 | 11:00 | 11:05 | UNDONE |
| ... | ... | ... | ... | ... | ... | ... | ... | ... | ... | ... |

| ROBOT ID | | ID=1 | | | | ID=2 | | ... |
|---|---|---|---|---|---|---|---|---|
| PRIORITY ORDER | TASK ID | PRIORITY | CONTENT | STATUS | | TASK ID | PRIORITY | |
| 1 | 3 | 3 | TRANSPORT | IN EXECUTION | | 4 | 7 | |
| 2 | 7 | 4 | GUIDE | RESERVED | | 6 | 2 | |
| 3 | ... | ... | ... | ... | | ... | ... | |

900 RULE DB

| RULE ID 901 | RULE CONTENTS 902 | PRIORITY 903 | THE NUMBER OF RULE CONDITIONS 904 | RULE CONDITION (VALUE OF THE SITUATION ID) 905 | ACTION ID 906 | INTEREST 907 | DAMPING_RATE 908 |
|---|---|---|---|---|---|---|---|
| 1 | GET SURPRISED BY A BIG SOUND = A CLIP | 1 | 1 | 5 = 「1」 | 4 | 100 | 1.2 |
| 2 | WHEN A BIG SOUND (NOT LESS THAN LEVEL 6) IS HEARD, SEE THE DIRECTION OF THE AUDIO SOURCE BY TWISTING ITS WAIST | 1 | 2 | 5 = 「1」<br>12 = 「NOT LESS THAN 6」 | 3 | 80 | 0.2 |
| 3 | WHEN SOME PEOPLE ARE PRESENT, LOOK AT THE NEAREST PERSON | 1 | 1 | 1 = 「1」 | 11 | 40 | 0.07 |
| 4 | WHEN A SOUND (NO MORE THAN LEVEL 5) IS HEARD, SEE THE DIRECTION OF AN AUDIO SOURCE (WHEN NOBODY IS PRESENT OR THERE IS SOME DISTANCE TO A PERSON) | 1 | 2 | 4 = 「1」<br>12 = 「NOT MORE THAN 5」 | 2 | 50 | 0.8 |
| 5 | WHEN A FACE IS RECOGNIZED IN FRONT OF THE ROBOT R, RAISE ITS HAND WITH FACING TOWARD THE PERSON. | 4 | 1 | 15 = 「1」 | 5 | 80 | 1.0 |
| 6 | WHEN NOBODY IS PRESENT, PERFORM A BREATHING-LIKE ACTION | 1 | | | | | |
| X | DOING NOTHING | 1 | | | | 50 | 1.0 |

FIG. 10

| ACTION ID | ACTION CONTENTS | NECK | PALM | WAIST | ARM | MOUTH |
|---|---|---|---|---|---|---|
| 0 | RETURN TO AN INITIAL POSITION | | | | | |
| 1 | DOING NOTHING | | | | | |
| 2 | SEE THE DIRECTION OF AN AUDIO SOURCE BY ROTATING ITS HEAD | O | | | | |
| 3 | SEE THE DIRECTION OF AN AUDIO SOURCE BY TWISTING ITS WAIST | | | O | | |
| 4 | GET SURPRISED | O | | | | |
| 5 | RAISE ITS HAND WITH TURNING ITS HEAD AND ITS BODY TOWARD A TARGET | O | | O | O | |
| 6 | BREATHING-LIKE ACTION | O | O | | O | |
| 7 | EASE THE TENSION OF ITS SHOULDER | | | | O | |
| 8 | EASE THE TENSION OF ITS SHOULDER 2 | | | | O | |
| 9 | UTTERANCE (1) YES 1 | | | | | O |
| 10 | UTTERANCE (2) YES 2 | | | | | O |

FIG. 11A

1100 SITUATION DB (PRESENT SITUATION)

| SITUATION ID | SITUATION CONTENTS | PRESENT STATE (on=1, off=0) |
|---|---|---|
| 0 | ABNORMALITY IN IMAGE | on/off |
| 1 | NOBODY PRESENT | on/off |
| 2 | A PERSON IS PRESENT | on/off |
| 3 | A PERSON IS APPROACHING | on/off |
| 4 | A SMALL SOUND IS HEARD | on/off |
| 5 | MIKE CLIP | on/off |
| 6 | CHARGING FLAG | on/off |
| 7 | THE DIRECTION OF AN AUDIO SOURCE (DEG.) | VALUE |
| 8 | THE TIME PERIOD WHEN A PERSON IS PRESENT (SEC.) | VALUE |

FIG. 11B

CONTENT CANDIDATES TO BE WRITTEN

| SITUATION (SITUATION ID) | SELECTED RULE (ACTION ID) | PRIORITY | INTEREST | DAMPING RATE | ACTION IN EACH PART | | | | | |
|---|---|---|---|---|---|---|---|---|---|---|
| | | | | | NECK | PALM | WAIST | ARM | MOUTH | |
| SITUATION ID 5 = "1" (BIG SOUND IS HEARD) | RULE1 ⟨ACTION ID=4⟩ | 1 | 100 | 1.2 | ○ | × | × | × | × | |
| SITUATION ID 2 = "1" (A PERSON IS PRESENT) | RULE5 ⟨ACTION ID=5⟩ | 4 | 80 | 1.0 | ○ | × | ○ | ○ | × | |
| SITUATION ID 4 = "1" (A SMALL SOUND IS HEARD) | RULE4 ⟨ACTION ID=2⟩ | 1 | 50 | 0.8 | ○ | × | × | × | × | |
| SITUATION ID 1 = "1" (NOBODY PRESENT) | RULE6 ⟨ACTION ID=6⟩ | 1 | 90 | 1.0 | ○ | ○ | × | ○ | × | |
| REMAINING INTEREST = "0" | SPECIAL RULEX ⟨ACTION ID=0⟩ | 1 | | | RETURN TO AN INITIAL POSITION | | | | | |

ACTION START POSITION (PRESENT POSITION)

ACTION COMPLETED POSITION (INSTRUCTED POSITION)

FIG. 14

| t | TOTAL | NECK | PALM | WAIST | ARM | MOUTH |
|---|---|---|---|---|---|---|
| 0 | 80[1.0] | 80[1.0] | 0[0.0] | 80[1.0] | 80[1.0] | 0[0.0] |
| 1 | 79[1.0] | 79[1.0] | 0[0.0] | 79[1.0] | 79[1.0] | 0[0.0] |
| ... | ... | ... | ... | ... | ... | ... |
| 20 | 60[1.0] | 60[1.0] | 0[0.0] | 60[1.0] | 60[1.0] | 0[0.0] |
| ... | ... | ... | ... | ... | ... | ... |
| 30 | 50[1.0] | 50[1.0] | 0[0.0] | 50[1.0] | 50[1.0] | 0[0.0] |
| 31 | 49.2[0.8] | 49.2[0.8] | 0[0.0] | 49[1.0] | 49[1.0] | 0[0.0] |
| ... | ... | ... | ... | ... | ... | ... |
| 80 | 10[0.8] | 10[0.8] | 0[0.0] | 0[0.0] | 0[0.0] | 0[0.0] |
| 81 | 9.2[0.8] | 9.2[0.8] | 0[0.0] | 0[0.0] | 0[0.0] | 0[0.0] |
| ... | ... | ... | ... | ... | ... | ... |
| 93 | 0[0.0] | 0[0.0] | 0[0.0] | 0[0.0] | 0[0.0] | 0[0.0] |

FIG. 15

1500 RULE DB

| 1501 RULE ID | 1502 PRIORITY | 1503 RULE CONDITION | 1504 ACTION ID | 1505 INTEREST | 1506 DAMPING RATE |
|---|---|---|---|---|---|
| 20 | 1 | THE TIME PERIOD WHEN NOBODY IS PRESENT>5000 | 30 | 100 | 0.3 |
| 21 | 1 | THE TIME PERIOD WHEN NOBODY IS PRESENT>5000 | 31 | 60 | 0.4 |
| 22 | 1 | THE TIME PERIOD WHEN NOBODY IS PRESENT>5000 | 32 | 80 | 1.0 |
| X | 1 | THE TIME PERIOD WHEN NOBODY IS PRESENT>5000 THE TIME PERIOD WHEN NOBODY IS PRESENT<10000 | DOING NOTHING | 50 | 1.0 |

COMMUNICATION ROBOT

CROSS REFERENCE TO RELATED APPLICATIONS

This application claims the foreign priority benefit under 35 U.S.C. §119 of Japanese Patent Application No. 2007-316234 filed on Dec. 6, 2007, the disclosure of which is incorporated herein by reference.

BACKGROUND OF THE INVENTION

1. Field of the Invention

The present invention relates to a communication robot capable of communicating with people, and more particularly to a communication robot that can naturally express motions of its movable parts or make a speech.

2. Description of the Related Art

A robot has been conventionally known which determines its behavior based on an external situation and its internal status in order to enhance the amusement property for a pet robot (e.g. refer to Unexamined Japanese Patent Application Publication No. 2004-283958, paragraphs 0136-0148, FIG. 18). A robot disclosed in Unexamined Japanese Patent Application Publication No. 2004-283958 has a plurality of behavior describing modules (schemes) in which actions having objectives, such as "exploring", "eating", and "playing" are described. Each scheme calculates, by using a predetermined function, an activation level AL of an action, which is the degree of execution priority of the scheme, in response to a change in the internal status of the robot or an external stimulus. Generally, the robot selects a scheme that has the highest AL, and expresses an action that corresponds to the scheme.

For example, the robot selects a scheme in which an action "kick a ball" is described when a user says to the robot "kick the ball" as a predetermined external stimulus. The selected scheme calculates the AL of the action so as to grasp how willing the robot is to perform the action, and determines whether or not the robot obeys the user's instruction based on the value of the AL. When the value of the AL is positive the robot obeys the user's instruction. In contrast, when the value of the AL is negative, the robot expresses a negative desire that it does not want to perform the action by emitting a predetermined sound "No, I don't want to" which notifies the user of the rejection of the action. As described above, the robot does not obey the user's instruction depending on the value of the AL of the action, which enhances the entertainment property of the robot.

However, since the robot disclosed in Unexamined Japanese Patent Application Publication No. 2004-283958 selects, among a plurality of predetermined schemes, a scheme to be executed, actions expressed by the robot are monotonous. Furthermore, the robot stays still in a resting state when the robot does not perform any action specified by the schemes, which makes the robot appear to behave unnaturally.

Some robots (communication robot) are required to perform actions to execute various tasks efficiently, such as a transportation task or a guide task while communicating with people. In this case, if actions expressed by the robot are monotonous, a user may not have a sense of affinity but a sense of discomfort to the robot, which may become an obstacle for the communication. Therefore, the communication robot is desired to be able to express a variety of actions in addition to the actions for efficiently executing the tasks.

SUMMARY OF THE INVENTION

The present invention is made in view of the above problems and has been made in an attempt to provide a communication robot that can express a variety of actions.

A first aspect of the present invention provides a communication robot including: an external information acquiring unit for acquiring external information indicating a surrounding situation; an audio output unit for outputting a sound based on speech information; and a plurality of movable parts, each of which performs an action recognizable to a communication target, the communication robot further including: a situation database storing unit for storing a situation database which stores first data indicating a situation and second data related to operations of the audio output unit and the plurality of movable parts, the first data including the external information acquired by the external information acquiring unit which indicates the surrounding situation; a main controller which writes information in the situation database; a rule database storing unit for storing a rule database which includes a plurality of rules, each having an execution command of at least one of a speech and an action corresponding to the situation and an action inducing parameter which is related to an expression of the at least one of the speech and the action indicated by the execution command; a situation change detection unit for detecting writing of information by the main controller into the situation database as a situation change; a rule detection unit for detecting, from the rule database, a rule corresponding to the situation indicated by the first data stored in the situation database when the writing of information by the main controller into the situation database is detected by the situation change detection unit; an action inducing parameter setting unit for setting, as the second data stored in the situation database, the action inducing parameter contained in the detected rule to at least one of the movable parts and the audio output unit independently; a parameter changing unit for independently changing the action inducing parameter which has been set for the at least one of the movable parts and the audio output unit as the second data stored in the situation database; and a command unit for requesting the at least one of the movable parts and the audio output unit to execute the execution command indicated by the rule which includes the action inducing parameter set in the situation database.

In the aforementioned communication robot, each of the plurality of rules stored in the rule database includes an initial value and a damping rate of the action inducing parameter, the action inducing parameter setting unit sets the initial value of the action inducing parameter contained in the detected rule in the situation database, and the parameter changing means decreases the initial value of the action inducing parameter set in the situation database at the damping rate in response to a elapsed time.

In the aforementioned communication robot, the rule parameter changing unit changes the damping rate of any one of the plurality of rules stored in the rule database depending on the number of times the any one of the plurality of rules is executed.

In the aforementioned communication robot, the rule database includes a priority level in each of the plurality of rules, and the action inducing parameter setting unit includes a priority level comparing unit for comparing a priority level contained in the detected rule and a priority level contained in a rule being executed, a parameter comparing unit for comparing the initial value of the action inducing parameter contained in the detected rule and a present value of the action inducing parameter contained in the rule being executed when the priority level contained in the detected rule is greater than the priority level of the rule being executed, a rule changing unit for setting the initial value of the action inducing parameter contained in the detected rule in the situation database when the initial value of the action inducing parameter contained in the detected rule is equal to or greater than the present value of the action inducing parameter of the rule being executed.

The communication robot according to claim 1, wherein the situation database stores, as data indicating internal status of the communication robot, data indicating whether or not a battery of the communication robot is under charging, and the situation change detection unit is triggered to start a process for detecting a change in the situation database when the communication robot is connected to a battery charger.

Other features and advantages of the present invention will become more apparent from the following detailed descriptions of the invention when taken in conjunction with the accompanying drawings.

BRIEF DESCRIPTION OF THE DRAWINGS

FIG. 4 is an illustration showing an example of a task information database stored in the storage of the management computer shown in FIG. 1.

FIG. 5 is an illustration showing an example of a task schedule table stored in the storage of the management computer shown in FIG. 1.

FIG. 9 is an illustration showing an example of a rule DB stored in the rule DB storage means shown in FIG. 8.

FIG. 10 is an illustration showing an example of an action DB stored in the rule DB storage means shown in FIG. 8.

FIG. 11A is an illustration showing examples of present status of situation contents stored in the situation DB.

FIG. 11B is an illustration showing examples of content candidates to be written in the situation DB in accordance with situations.

FIG. 14 is an illustration showing an example of a history of dumping ratios written in the situation DB.

FIG. 15 is an illustration showing another example of the rule DB.

DETAILED DESCRIPTION OF THE INVENTION

Figure 1:
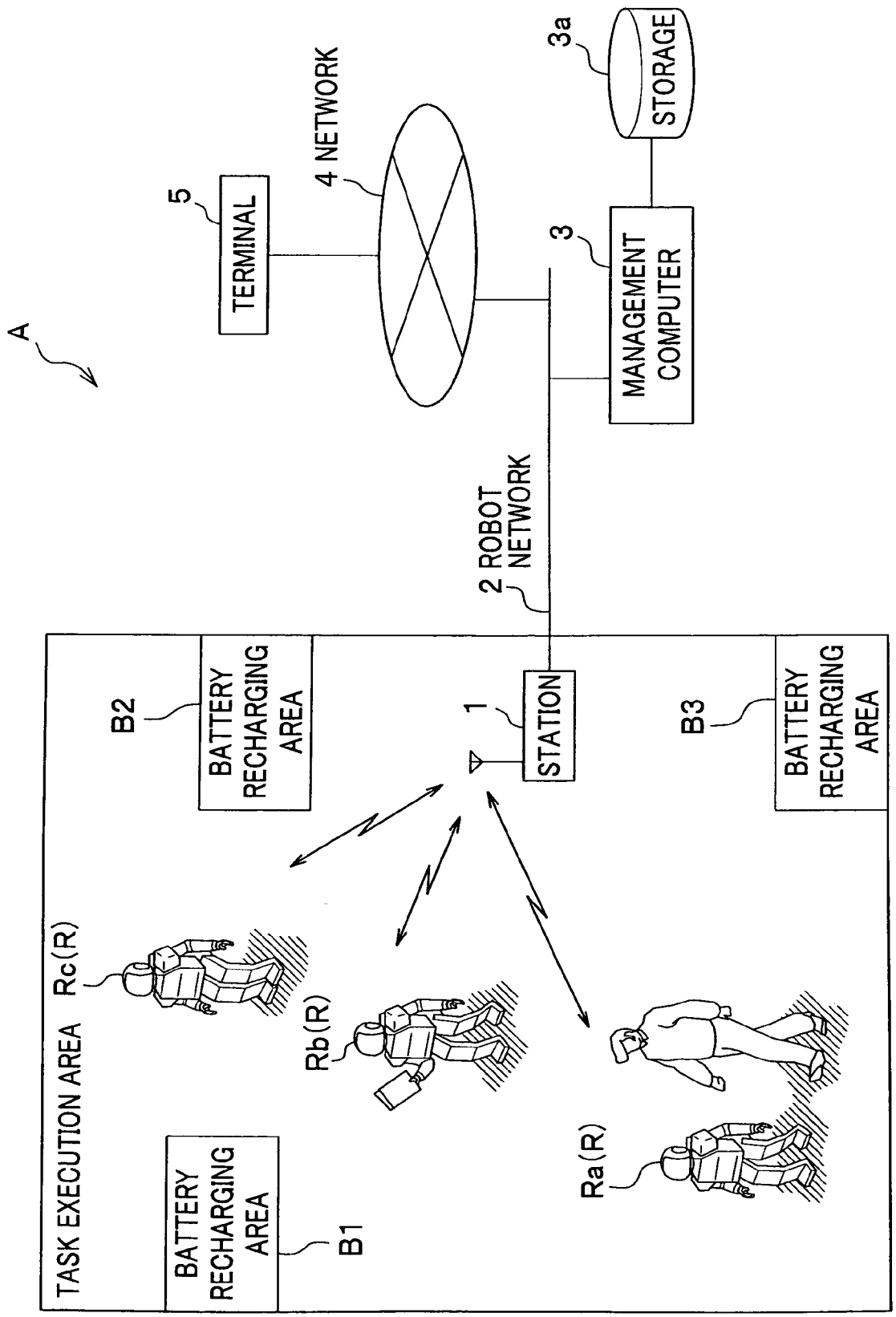
FIG. 1 is a schematic diagram of a robot control system A including a robot R according to an embodiment of the present invention.

Hereinafter, with reference to the attached drawings, descriptions will be provided on an embodiment that implements a communication robot (hereinafter referred to simply as a "robot") of the present invention. First, with dereference to FIG. 1, descriptions will be given on a general configuration of a robot control system A including the robot R according to the embodiment of the present invention. FIG. 1 shows a schematic diagram of the robot control system A including the robot R according to the embodiment of the present invention.

[Robot Control System A]

As shown in FIG. 1, the robot control system A includes at least one robot R, a station 1 that is connected to the robot R via wireless communication, a management computer 3 connected to the station 1 via a robot network 2, and a terminal 5 that is connected to the management computer 3.

In FIG. 1, the robot control system A includes plural robots Ra, Rb, Rc (hereinafter referred to simply as the "robot R" unless otherwise stated), and each robot R executes a task in accordance with an execution plan of the task (task schedule) that is predefined for each robot R through the management computer 3.

Hereinafter, a two-leg type autonomous mobile robot will be described as an example of the invention.

The robot R executes a task in response to an execution instruction input from the management computer 3, and at least one robot R is located within a task execution area predefined as an area where the robot R executes the task.

In the case of FIG. 1, three robots R are illustrated: the robot Ra is executing a task to guide a visitor to a particular place such as a meeting room (guide task); the robot Rb is executing a task of carrying an article to a particular person (transportation task); and the robot Rc stays in the stand-by mode until a new task is given. In FIG. 1, three battery recharging areas B1, B2 and B3 are provided in the task execution area, and the robot R can replenish its battery (battery replenish task) as needed.

Figure 2:
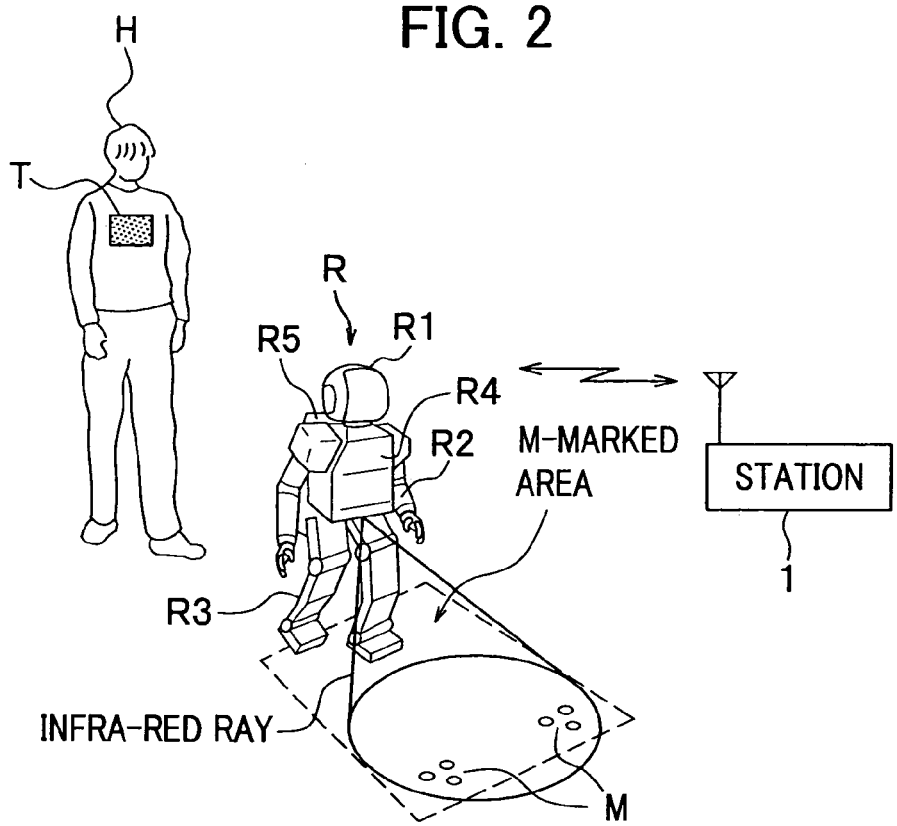
FIG. 2 is a schematic illustration showing a self-position detection and object detection by the robot R.

As shown in FIG. 2, the robot R includes a head R1, arms R2, legs R3, a body R4 and a back housing section R5. The head R1, each arm R2 and each leg R3 are connected to the body R4, each of which is driven by respective actuators (driving means), and the robot R's bipedal walk is controlled by an autonomous motion control unit 50 (see FIG. 6). More details on such a robot's bipedal walk mechanism are described in JP 2001-62760A, for example.

When executing a guide task, for example, the robot R guides a person H in a predetermined guide area (e.g. movement area such as an office or a hallway). In this example, the robot R irradiates light (e.g. infrared ray, ultraviolet ray, leaser beam) and radio waves toward a circumference of the robot R, thereby to detect the person H wearing a tag T in the circumferential region, identify a position of the detected person H and approach to him or her so that the robot R executes a personal identification to find who the person H is, based on the tag H. This tag T receives infrared ray and radio waves transmitted from the robot R for the sake of identifying the position (distance and orientation) of the person H. Based on signals indicating a light-receiving orientation included in the infrared ray and the robot ID included in the received radio waves, the tag T generates a receiving report signal that includes the tag ID number, and sends this receiving report signal back to the robot R. When receiving the receiving report signal, the robot R recognizes the distance and orientation to the person H wearing the tag T, so that the robot R can approach this person H.

When the robot R autonomously moves within the guide area to execute a particular task (e.g. guide task or transport task), the robot R irradiates laser slit light or infrared ray, thereby to detect ground conditions or find marks provided on the ground (or floor) surface. Specifically, the robot R determines where itself moves within the movement area, and if the robot R determines itself moving within a regular movement area, the robot R irradiates laser slit ray onto the ground (or floor) surface to detect steps, rolls or obstacles on the ground. If the robot R detects itself moving within an M-marked area, the robot R irradiates the infrared ray onto the ground surface to detect a mark M, so that the robot R recognizes and corrects its position and the like. The mark M may be, for example, made of reflective material that recursively reflects the infrared ray. The mark M includes position data, and this position data is virtually included in map data, and actually stored on the storage 30 (see FIG. 6). The map data includes the position data regarding the mark M provided on a predetermined position within the guide area, as well as data regarding an M-marked area, which has a predetermined broader range in addition to the mark M position. The M marked area refers to an area defined with a predetermined distance from the mark M; for example, a circular area with a radius of 1 to 3 m from the mark M as a center; a rectangular area extending 3 m (toward the robot R side) from the mark M, or the like.

Returning to FIG. 1, descriptions will be given on the configuration of the robot control system A.

The station 1 relays data exchange between the robot R and the management computer 3.

Specifically, the station 1 sends an execution instruction output from the management computer 3 to the robot R, and also receives data regarding the robot R's conditions and a signal representing that the robot R has received the execution instruction (i.e. receiving report signal) from the robot R, and then outputs the signal received to the management computer 3.

As for the station 1, at least one station 1 may be provided in each task execution area to ensure a stable data exchange between the robot R and the management computer 3.

In some case, a task execution area may be located across multiple floors in the building. In such a case, the task execution area may preferably be divided into multiple sub-areas, so that each floor may have a single sub area. If a single station 1 cannot cover the whole task area, multiple stations 1 may be provided across the task area.

The station 1, the management computer 3 and the network 4 are connected with one another through the robot network 2, which may be implemented using LAN (Local Area Network), for example.

The management computer 3 manages at least one robot R, and provides various controls on the robot R's movement/ speech via the station 1 and the robot network 2, as well as providing information necessary for the robot R. Note that this necessary information may include a detected person's name and maps in the vicinity of the robot R, etc., and such information is stored on the storage 3a of the management computer 3.

Figure 3:
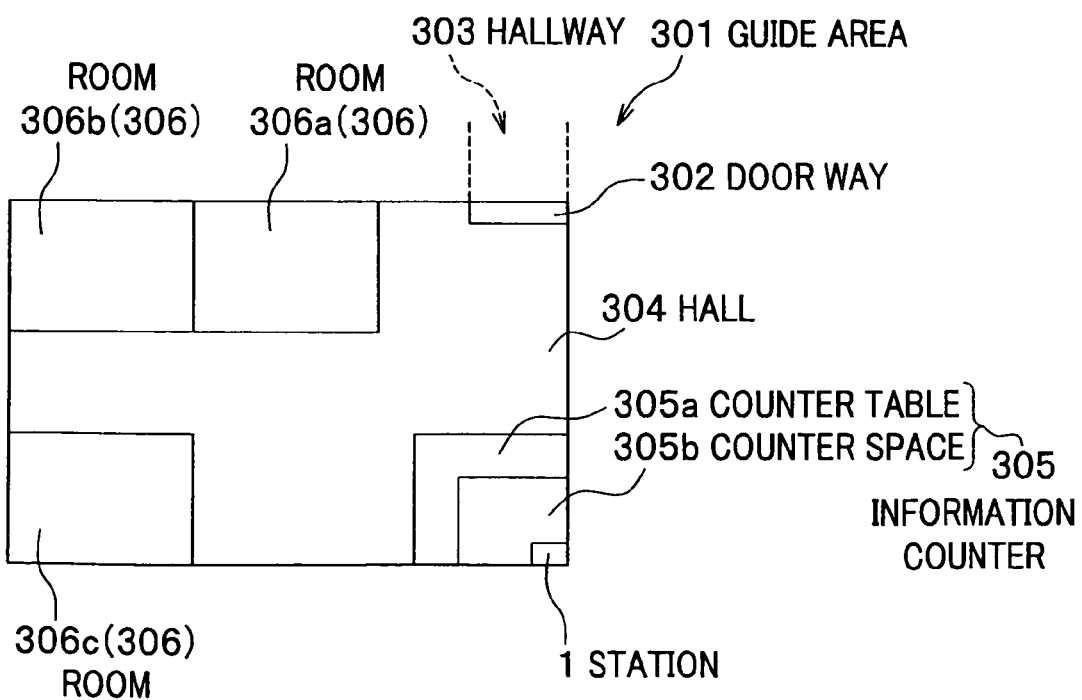
FIG. 3 is a drawing that shows an example of a local map used in the robot system A of FIG. 1.

FIG. 3 is a drawing that shows an example of a local map used in the robot control system A of FIG. 1. In this example, the guide area 301 is a rectangular area on a particular floor in a building, as seen in FIG. 3. The robot R and a person H guided by the robot R enter through a hallway 303 outside a door way 302 of a guide area 301 into this guide area 301. Inside the door way 302, the hall 304 stretches out, and there is an information counter 305 at the back corner of the hall 304, and there are multiple meeting rooms 306 (306a, 306b, 306c) partitioned as a separate room along the wall side of the guide area 301. The information counter 305 includes an L-shaped counter table 305a and a counter space 305b where a clerk serves. There is provided the station 1 in the counter space 305b. The management computer 3 stores on the storage 3a (see FIG. 1), local maps (local map data) that associate local information regarding local maps of hallways and rooms, etc. with corresponding positional coordinates, as well as a global map that is map information regarding task execution areas, and are build up with the above local maps.

The management computer 3 also stores on the storage 3a (see FIG. 1) the task information database 400 storing information regarding tasks executed by the robot R (task data).

As shown in FIG. 4, the task information database 400 includes various information items, such as: a task ID as an identifier uniquely assigned to each task; priority of a task; importance of a task; a robot ID as an identifier uniquely assigned to each robot, which is used when instructing the robot to execute a task; task content representing such as "guide", "transport (transport of an article)", etc.; a start point to start a task in the task execution area; an end point to end a task in the task execution area; time required for executing the task; a scheduled start time to start a task (start time); a scheduled end time to end a task (end time); and status of a task.

The management computer 3 also assigns to each robot R a task execution plan (task schedule) that schedules the robot R to execute a task.

As shown in FIG. 5, the task schedule table 500 includes various information items, such as: priority order of tasks to be executed by the robot R; a task ID to identify a specific task included in the task information database 400 (see FIG. 4); priority of a task; content of a task; and status of a task. The task schedule table 500 includes these information items arranged for each robot R, so as to understand what task is assigned to which robot R in what priority order.

Returned to FIG. 1, descriptions will be provided on the configuration of the robot control system A.

The terminal 5 is connected to the management computer 3 via the network 4, registers information regarding persons, and or modifies the registered information on the storage 3a.

The terminal 5 also registers a task to be executed by the robot R, changes a task schedule that is defined on the management computer 3, and inputs instructions regarding the robot R's actions.

Hereinafter, descriptions will be provided on the robot R.

[Robot]

The robot R includes cameras C, C, a speaker S, microphones MC, MC, an image processor 10, an audio processor 20, a storage 30, a main controller (also referred to as a "controller") 40, an autonomous motion control unit 50, a wireless communication unit 60, a battery 70, an object detector 80 and a circumference sensor 90, as well as the head R1, each arm R2, each leg R3, the body R4 and the back housing section R5.

The robot R further includes a gyro sensor SR1 that detects an orientation in which the robot R heads, and a GPS (Global Positioning System) receiver SR2 for acquiring positional coordinates that identifies a current position of the robot R on a predetermined map.

[Cameras]

The cameras (also referred to as a "vision sensor") C, C, capture digital data on images in the proceeding direction ahead of the robot R in digital data, and a color CCD (Charge-coupled Device) may be used as the cameras C, C. The cameras C, C are disposed on the right and left sides pair at the same height level, and output captured images to the image processor 10. The cameras C, C, the speaker S and the microphones MC, MC (audio input unit) are provided in the head R1. The speaker S (also referred to as an "audio output means") utters predetermined voices synthesized in the audio processor 20.

[Image Processor]

The image processor 10 processes images (shot images) shot by the cameras C, C so as to recognize obstacles and people around the robot R for grasping the situation around the robot R based on the shot images. The image processor 10 includes a stereo process unit 11a, a moving object extraction unit 11b and a face recognition unit 11c. The image processor 10 and the cameras C, C are also referred to as an external information acquiring unit.

The stereo process unit 11a performs pattern matching between the two images taken by the left and right cameras C, C, respectively, using one of the two images as a reference. The stereo process unit 11a also calculates a parallax between each pair of pixels included in the two images in pair, so as to generate a parallax image from the paired two images. The stereo process unit 11a then outputs the generated parallax image and the original images to the moving object extraction unit 11b. Note that this calculated parallax represents a distance from the Robot R to the target object whose images are taken by the cameras C, C.

The moving object extraction unit 11b extracts a moving object in the images based on the data output from the stereo process unit 11a. This process is performed to recognize a person, assuming that the moving object is a person.

The moving object extraction unit 11b stores several frames of past images to extract a moving object, and compares the latest image and the past images for pattern matching between the latest image and the past images, so as to calculate a displacement of each pixel between the latest image and the past images, thereby to generate a motion image. Based on the above parallax and motion images, if there are pixels having greater displacements in a predetermined distance range from the cameras C, C, the moving object extraction unit 11b estimates that there is a person, and extracts part of the parallax only defined in the predetermined distance range from the cameras C, C, as a moving target object. The moving object extraction unit 11b then outputs the images of the moving target object to the face recognition unit 11c.

The face recognition unit 11c determines a face region and a face position of the moving target object based on a size and or a shape at a part of the extracted moving target object. Similarly, a hand position may further be identified based on the size and or the shape at the part of the extracted moving target object.

The face recognition unit II c outputs the recognized face position to the main controller 40 for information to be used when the robot R moves or communicates with the moving target object.

[Audio Processor]

The audio processor 20 includes an audio synthesis unit 21a, voice recognition unit 21b and sound-source position determination unit 21c.

Based on the instruction regarding speech behavior defined and output by the main controller 40, the audio synthesis unit 21a generates voice sound data from text data, and outputs voice sound based on the generated voice sound data through the speaker S. When generating the voice sound data, correspondence relationships between the text data and the voice sound data stored in the storage 30 in advance are used. The voice sound data is acquired from the management computer 3, and is stored in the storage 30.

Voice sound data is input through the microphones MC, MC to the voice recognition unit 21b (also referred to as "voice recognition means"), which generates text information from the input voice sound data, and outputs this text information to the main controller 40. The correspondence relationships between the voice sound data and the text data are stored in the storage 30 in advance. The voice recognition unit 21b and the microphones MC, MC are also referred to as an external information acquiring unit.

The sound-source position determination unit 21c identifies a position of a sound source (a position in a plane state that the robot R recognizes) based on a difference in the sound pressure and the time of sound arrival between the microphones MC, MC, and outputs this identified position of the sound source to the main controller 40. The position of the sound source may be represented by a rotational angle θz around the direction where the robot R stands (i.e. z axis direction).

[Storage]

The storage 30 may be constituted, for example, of general-purposed hard disks, and stores necessary information sent from the management computer 3 (e.g. local map data, data for speech). The storage 30 stores information necessary for the main controller 40 to execute various operations, as described later.

[Main Controller]

The main controller 40 integrally controls the image processor 10, the audio processor 20, the storage 30, the autonomous motion control unit 50, the wireless communication unit 60, the object detector 80 and the circumference sensor 90.

Data detected by the gyro sensor SR1 and GPS receiver SR2 is output to the main controller 40, where the received data is used for determination of the robot R's behavior. The main controller 40 performs various determinations to provide various controls, such as on communication to the management computer 3; on execution of a predetermined task in response to a task execution instruction acquired from the management computer 3; on moving the robot R to a destination; on identification of a person: on conversation with a person, and also generates various instructions for motions of each parts of the robot R.

[Autonomous Motion Control Unit]

The autonomous motion control unit 50 drives the head R1, each arm R2, each leg R3 and the body R4, in response to the instructions from the main controller 40. The autonomous motion control unit 50 includes a neck control unit that drives a neck joint of the head R1; a hand control unit that drives finger joints of a hand of each arm R2; an arm control unit that drives a shoulder joints, elbow joints and wrist joints of the arms R2; a waist control unit that rotationally drives the body R4 relative to the legs R3 in the horizontal direction; and a leg control unit that drives hip joints, knee joints and ankle joints of the legs R3, which are not shown in the drawings. The neck control unit, the hand control unit, the arm control unit, the waist control unit and the leg control unit send their driving signals to the respective actuators that drive the head R1, the arms R2, the legs R3 and the body R4, respectively.

[Wireless Communication Unit]

The wireless communication unit 60 transmits and receives data to/from the management computer 3. The wireless communication unit 60 includes a public line network communication device 61a and a wireless communication device 61b.

The public line network communication device 61a is a wireless communication means utilizing public network such as mobile phone network, PHS (Personal Handyphone System) network. The wireless communication device 61b is a wireless communication means for a short distance wireless communication such as wireless LAN complying with IEEE 802.11b. In response to an access request from the management computer 3, the wireless communication unit 60 selects the public line network communication device 61a or the wireless communication device 61b to perform data communication with the management computer 3.

In response to an access request from the management computer 3, the wireless communication unit 60 selects the public line network communication device 61a or the wireless communication device 61b to perform data communication with the management computer 3.

The battery 70 serves as power supply source for supplying power required for motion on each part of the robot R. A rechargeable battery may be used as the battery 70, and recharging the battery 70 may be carried out at the battery recharging areas B1, B2, B3 (see FIG. 1) when the robot R is connected to the battery charger.

[Object Detector]

The object detector 80 detects whether or not a person wearing a tag T exists in the vicinity of the robot R. The object detector 80 includes plural light-emitting parts 81 (only one shown in FIG. 6). The light-emitting parts 81 may be constituted of, for example, LED, and the light-emitting parts may be provided along the peripheral surface of the robot R's head R1, such as on the right and left sides or the back and front sides thereof (not shown). The object detector 80 emits, from each light-emitting part 81, infra-red ray including a signal representing a light-emitting part ID to identify each light-emitting part 81, and then receives a receiving report signal from the tag T when the gag T has received this infra-red ray. When receiving infra-red ray emitted from any of the light-emitting parts 81, based on the light emitting part ID included in this received infra-red ray, the tag T generates a receiving report signal; therefore, when the robot R refers to the light-emitting part ID included in this receipt report signal, the robot R determines in which direction the tag T exists viewed from the robot R. In addition, the object detector 80 has a function to determine the distance to the tag T, based on the radio field intensity of the receiving report signal acquired from the tag T. Hence, the object detector 80 can determine where the tag T exists (i.e. distance and direction of the tag T), which indicates a position of the person H. Furthermore, the object detector 80 emits not only infra-red ray from each light-emitting part 81, but also transmits radio waves including a signal representing the robot ID from an antenna (not shown), whereby, when receiving the radio waves, the tag T can correctly identify which robot R has transmitted this infra-red ray. Details of such an object detector 80 and a tag T are disclosed in JP2006-192563, for example. The object detector 80 is also referred to as the external information acquiring unit.

[Circumference Sensor]

The circumference sensor 90 detects circumferential conditions in the vicinity of the robot R, and acquires self-position data detected by the gyro sensor SR1 or the GPS receiver SR2. The circumference sensor 90 includes a laser radiation unit 91 that radiates a slit light toward a search zone, a infra-red ray radiation unit 92 that radiates an infra-red ray toward the search zone, and a floor-surface camera 93 that takes an image of the search zone where the slit light or the infra-red ray is radiated. The circumference sensor 90 analyses a slit-light image (image when the slit light was radiated) of the search zone that has been taken by the floor-surface camera 93 and detects the floor surface conditions. In addition, the circumference sensor 90 analyzes the infra-red ray image (when the slit light was radiated) taken by the floor-surface camera 93 so as to detect the mark M (see FIG. 2), and based on the position (coordinates) of the detected mark, the circumference sensor 90 calculates a positional relation between the mark M and the robot R. Details of such a circumference sensor 90 are disclosed in, for example, JP2006-167844A.

The circumference sensor 90 is also referred to as the external information acquiring unit.

[Main Controller]

Figure 6:
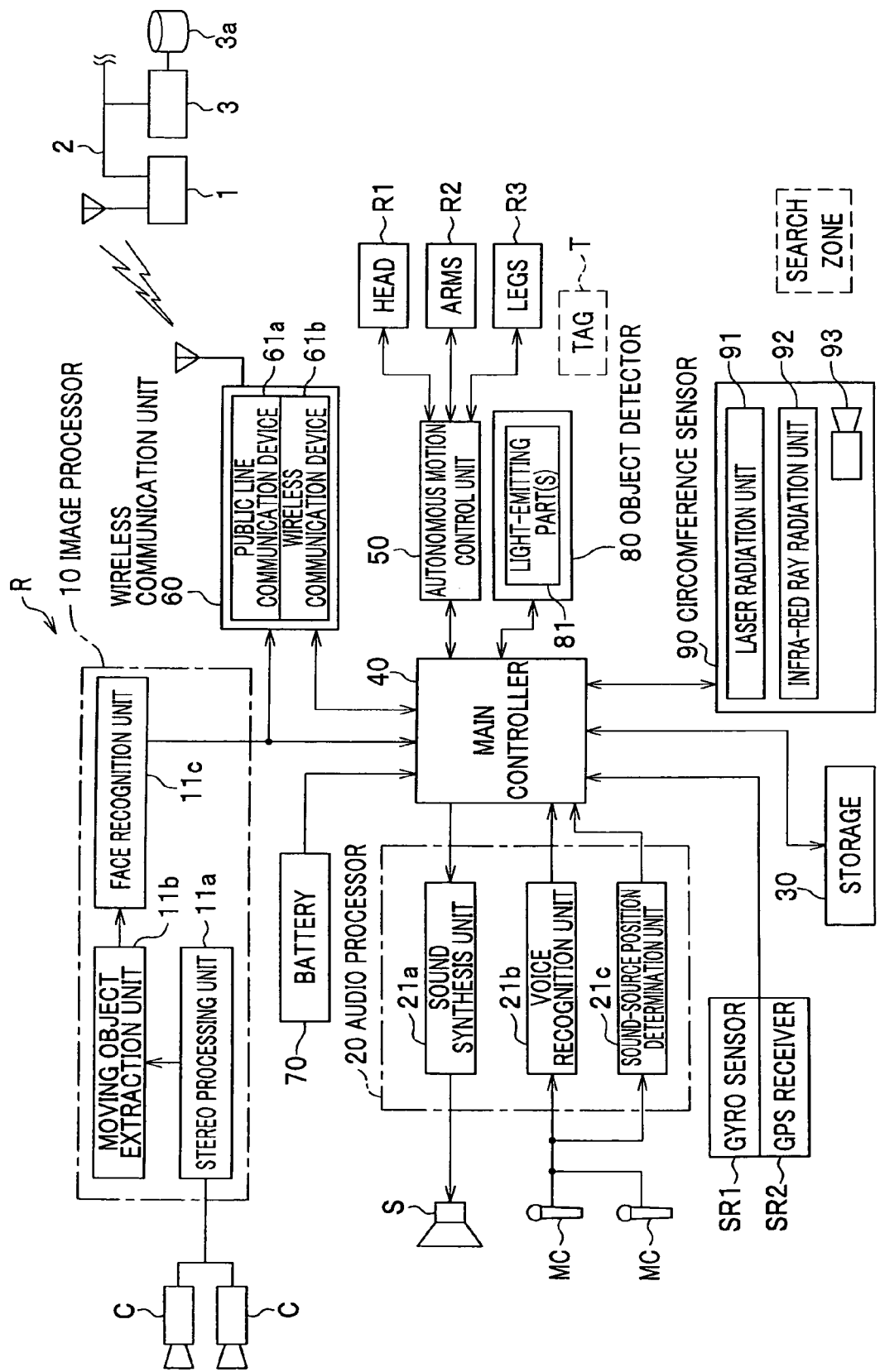
FIG. 6 is a block diagram showing the configuration of the robot according to the embodiment.
Figure 7:
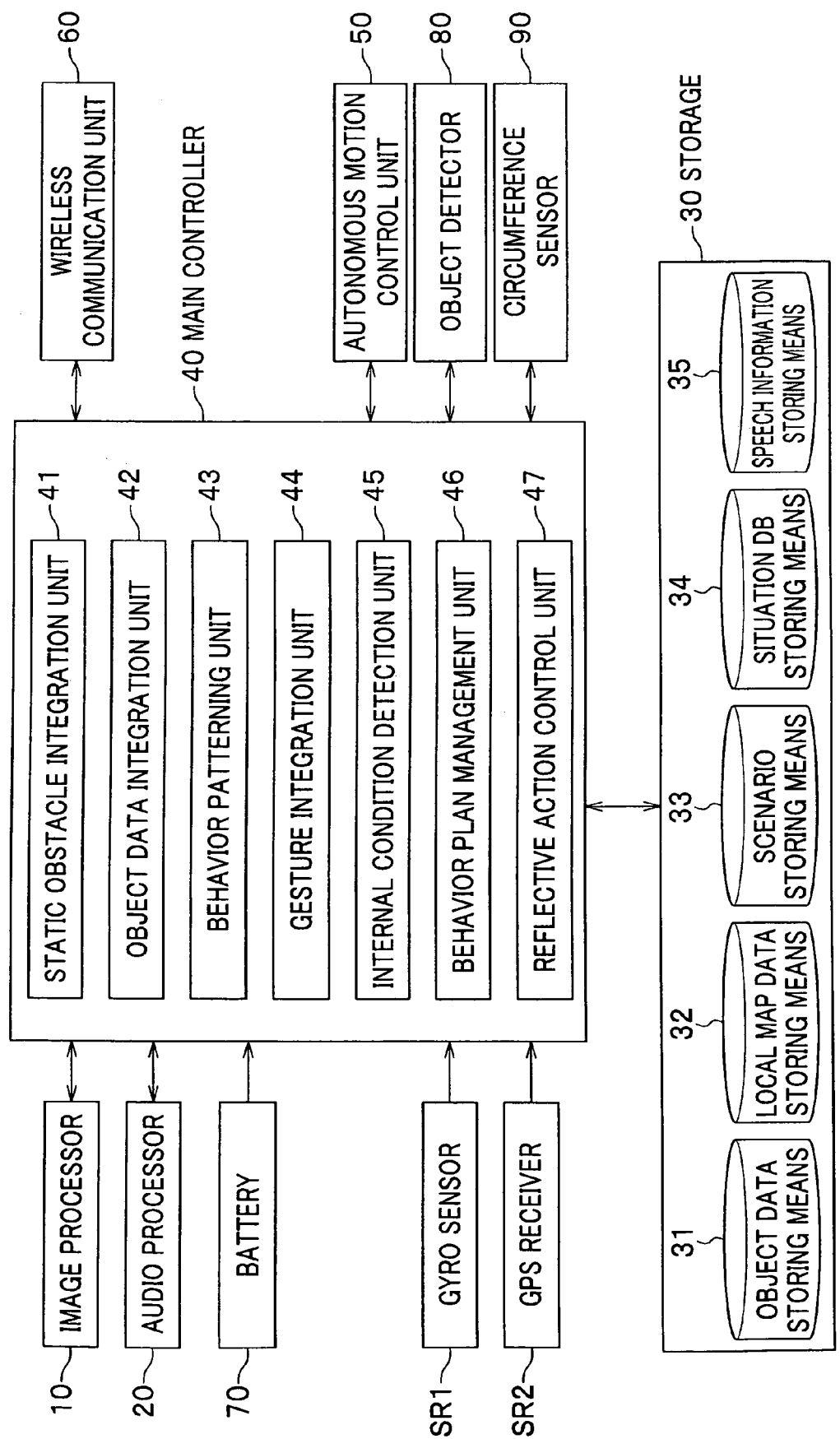
FIG. 7 is a block diagram showing the configuration of the main controller of the robot R in FIG. 6.

FIG. 7 is a block diagram showing the configuration of the main controller of the robot R in FIG. 6. The main controller 40 includes a static obstacle integration unit 41, an object data integration unit 42, a behavior patterning unit 43, an internal condition detection unit 45, a behavior plan management unit 46 and a reflective action control unit 47.

The static obstacle integration unit 41 integrates information regarding the circumferential conditions in the vicinity of the robot R detected by the circumference sensor 90, which is output to the behavior patterning unit 43.

For example, when the static obstacle integration unit 41 detects an obstacle, such as a cardboard container, or a step on the floor surface of the traveling way of the robot R, and based on this integrated information regarding the obstacle, the behavior patterning unit 43 finds a detour route on a local detour module (not shown).

The object data integration unit 42 integrates identification data (object data) regarding an object, based on posture data of the robot R, and input data from the image processor 10, the object detector 80 and the sound source position determination unit 21c, and outputs this integrated object data to the object data storing means 31 of the storage 30. Using this integrated object data input, the object data storing means 31 creates an object map that records this integrated object data into the object type and the time.

The behavior patterning unit 43 stores various programs (modules) to execute an appropriate behavior pattern, and refers to the storage 30 for getting information necessary when executing each behavior pattern, and reflects this necessary information in the behavior pattern.

In the present embodiment, as shown in FIG. 7 the storage 30 includes a local map data storing means 32 and a rule database storing means 33, a situation database storing means 34 and a speech information storing means 35, as well as an object data storing means 31.

The local map data storing means 32 stores maps of the vicinity of the robot R (local maps), as described with reference to FIG. 3. For example, the local maps may be acquired from the management computer 3.

The rule DB storage means 33 stores scenarios (acting scripts) corresponding to various behavior patterns, rules corresponding to various situations (rule DB), and specific action or speech contents for executing the rules (action DB). The rules define generation of actions expressed by the robot R. The scenarios include those regarding actions of, for example, stopping 1 meter ahead of a person or an obstacle (i.e. target object) when encountering this target object while walking, or lifting the arm R2 up to a predetermined position 10 seconds after stopping, as well as those regarding speech. The rule database storage means 33 stores scenarios predefined for specifying a gesture as a physical behavior of moving at least one of the head R1, the arms R2, the legs R3 and the body R4 when the robot R performs a predetermined speech. The action DB and rule DB stored in the rule DB storing means 33.

The situation DB storage means 34 stores information on the present situation (situation DB). In the embodiment, the situation DB stores data indicating a situation which includes, as a surrounding situation, a process result of the image processor 10 which processes images acquired by the cameras C, C, a process result of a voice recognition unit 21b which recognizes a voice input through the microphones MC, MC, and a recognition result of the tag T executed by the target detection unit 80. The information stored in the situation DB storage means 34 is used when selecting a rule stored in the rule DB storage means 33. Information on the selected rule is also written in the situation DB storage means 34. Specific example of the situation DB stored in the situation DB storage means 34 will be described later.

The speech information storing means 35 stores information used for a speech of the robot R. The speech information storing means 35 stores communication information which is determined by scenarios corresponding to various behavior patterns. The communication information includes. for example, a fixed phrase for greeting "Hello, Mr. . . . " and a fixed phrase for confirmation "This is to be sent to Mr. . . . , right ?". The speech information storing means 35 stores information of communication contents to be spoken during execution of a rule stored in the rule DB storage means 33. The information of communication contents to be spoken during execution of a rule includes, for example, a reply "Yes" and a fixed phrase indicating a time ". . . o'clock, . . . minutes". The information (communication data) is sent, for example, from the management computer 3.

The behavior patterning unit 43 includes various modules that execute correspondent behavior patterns in accordance with variety of scenes and situations, using the object data storing means 31, the local map data storing means 32 or the rule database storing means 33, the situation database storing means 34, and the speech information storing means 35 or in combination therewith, if necessary. There are various modules, such as, a destination path module, a local detour module, a delivery module, a guide module and a human handling module, and a reflective action module etc.

The destination path module finds a path from the robot R's current point to a destination where the robot R executes a particular task in the task execution area (e.g. searching a path between the nodes), and executes traveling along the found path to the destination. This destination path module refers to the map data and the current point of the robot R, and then calculates a minimum distance to the destination.

When an obstacle is detected while walking, the local detour module finds a detour route to get around the detected obstacle based on the obstacle information integrated by the static obstacle integration unit 41.

When an article delivery task is executed, the delivery module performs an action of receiving (gripping) an article from a person (client) who requests the article delivery, or an action of handing over (releasing) the article to a receiving person.

The guide module, for example, executes a task to navigate a visitor who comes to a guide start point in the task execution area to a clerk at the information counter 305 in the guide area 301 (see FIG. 3).

When the article delivery task or the guide task is executed, the human handling module, for example, performs an action of speech, posture change, moving the arm R2 up and down or gripping, etc.

The human handling module can greet or talk about the weather in accordance with the situation or a person the robot R is talking to, regardless of whether or not a task is executed.

The reflective action module performs a reflective action as a natural action (meaningful action) or a human-like action. Here, the reflective action means, for example, an action that, when the robot R recognizes a big sound on a side thereof during communication with a person in front of the robot R, the robot R faces in the direction of the sound source, being distracted from concentration on the communication as if the robot R were a human. The reflective action also includes, for example, a speech for replying "Yes" without any purpose when the robot R is talked to.

The gesture integration unit 44 extracts a gesture associated with a speech for a target person from the rule DB storage means 33, and outputs an instruction specifying the extracted gesture to the autonomous moving control unit 50. Gestures performed by motions of the head R1 includes, for example, actions indicating a "bow", "appreciation", an "agreement" and an "apology" by tilting the head R1 downward, and actions showing that the robot R does not understand what is said by tilting the head R1 to the right or left. Gestures performed by motions of the arms R2 includes, for example, actions indicating "joy" or "admiration" by raising the arms R2, and actions indicating "welcome" by opening the arms R2 in the left and right downward direction, respectively, or shaking hands. Gestures performed by motions of the leg R3 includes, for example, an action indicating "joy" or "energized" by running at a position where the robot R stands.

The internal condition detection unit 45 detects internal conditions of the robot R. In the present embodiment, the internal condition detection unit 45 detects the recharging state (information indicating whether or not the robot R is connected to a charger) and the remaining power of the battery 70, for example. The internal condition detection unit 45 generates data regarding conditions of the robot R (e.g. the current position, the recharging state, the remaining power of the battery, the task execution status, etc.) as the status information at the predetermined time intervals, and outputs the generated status information to the reflective action control unit 47. The internal condition detection unit 45 outputs the generated status information via the wireless communication unit 60 to the management computer 3. Then, the management computer 3 registers for each robot R the input status information on the robot information database (not shown) stored in the storage 3a (see FIG. 1).

The behavior plan management unit 46 manages behavior plans to execute the various modules of the behavior patterning unit 43 in accordance with predetermined schedules. In the present embodiment, the behavior plan management control unit 46 manages behavior plans, so as to execute an appropriate task in response to task execution instructions acquired from the management computer 3, and select an appropriate module required for executing the current task to be done.

The reflective action control unit 47 executes an action that is perceivable for an interaction object such as a human by using at least one of a plurality of moving parts (e.g. a head, a palm, a waist, an arm) and a speaker (voice output unit) S, each of which performs an action that is perceivable for the interaction object. The reflective action control unit 47 executes a variety of actions and speeches, and switches between a reflective action mode and the other behavioral patterns (for example, human handling module), which realizes smooth communication between the robot R and a human beings.

<Reflective Action Control Unit>

Figure 8:
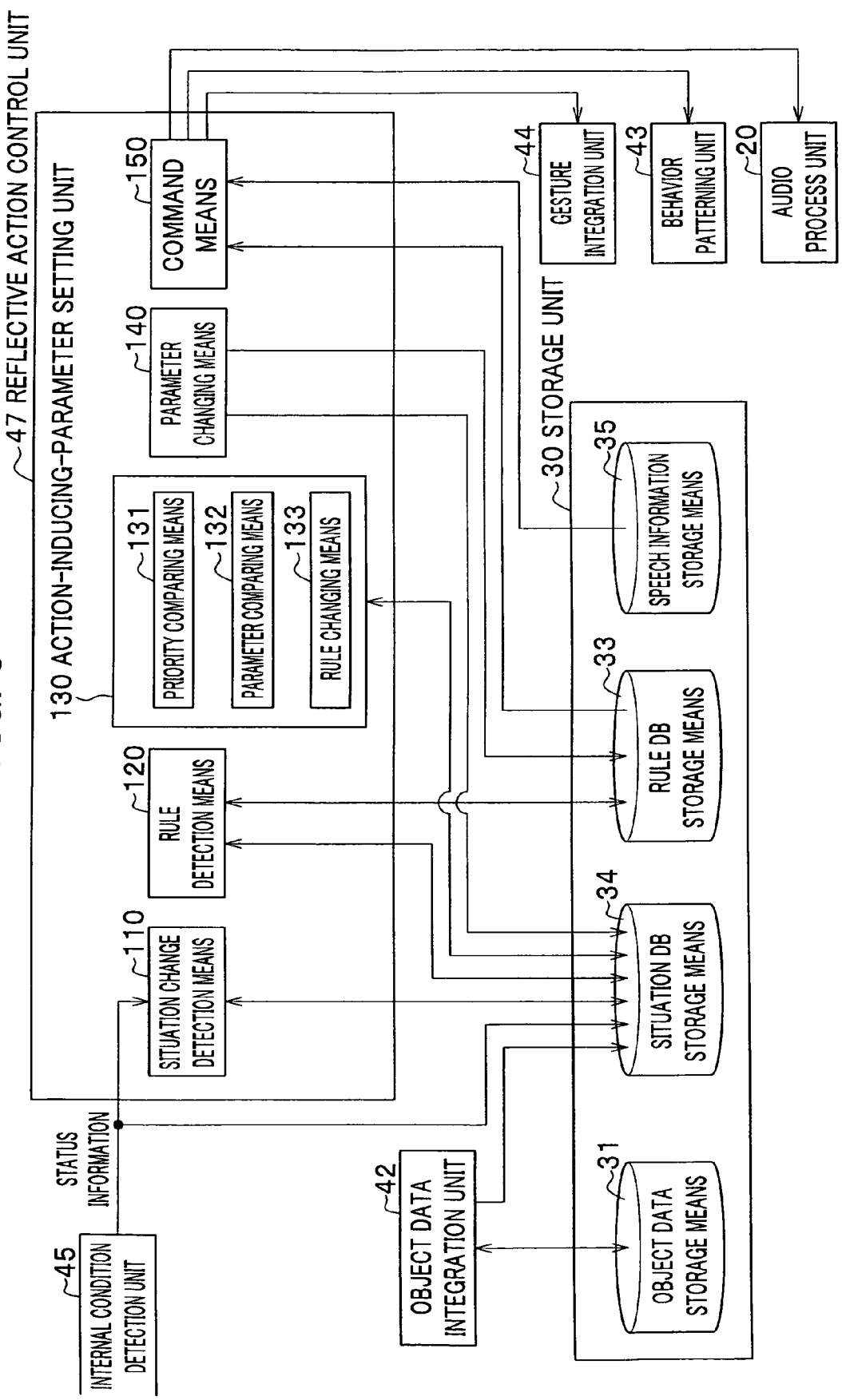
FIG. 8 is a block diagram showing a configuration of the reflective action control unit shown in FIG. 7.

FIG. 8 is a block diagram showing the reflective action control unit shown in FIG. 7.

The reflective action control unit 47 includes a situation change detection means 110, a rule detection means 120, an action inducing parameter setting means 130, a parameter change means 140 and an command means 150 as shown in FIG. 8, and performs control of reflective actions, which will be described later, based on various kinds of information and data stored in the storage 30 by using these means.

The rule DB storage means (rule data base storage means) 33 stored in the storage 30 includes the rule DB (rule data base) and the action DB (action data base) as described before.

The rule DB (rule data base) stores a plurality of rules, each of which contains an execution instruction of at least one of a speech and action responding to a situation, an action inducing parameter associated with expression of the at least one of the speech and action that is specified by the execution instruction. Hereinafter, the action inducing parameter is called "the degree of interest". In the embodiment, each rule in the rule DB also includes an initial value and a damping rate of the degree of interest as well as the degree of priority.

Specific examples of the rule DB and the action DB are described with reference to FIGS. 9 and 10. FIG. 9 is an illustration showing an example of the rule DB stored in the rule DB storage means in FIG. 8. FIG. 10 is an illustration of the action DB stored in the rule DB storage means in FIG. 8.

As shown in FIG. 9, items of a rule DB 900 include a rule ID 901, a rule content 902, the degree of priority (Priority) 903, the number of rule conditions 904, rule condition 905, an action ID 906, the degree of interest (Interest) 907, and an interest damping rate (Damping_rate) 908.

The greater the value in the degree of priority (Priority) 903, the higher the priority of the rule is.

The rule condition 905 shows a relationship between the rule content 902 and a situation content 1102 stored in the situation DB (see FIG. 11A). For example, the rule condition 905 shows that a situation associated with rule ID="1" is the situation indicated by the present state "1" of the situation ID="5" in the situation DB (see FIG. 11A). The present state "1" of the situation ID="5" in the situation DB (see FIG. 11A) indicates that the situation is "mike clip (a loud sound is heard)".

The number of rule conditions 904 shows the number of rule conditions that are related to the rule. When all conditions related to a rule are satisfied, the rule becomes an available candidate that is suitable for the situation.

The action ID 906 shows a relationship between the rule content 902 and an action content of the action DB (see FIG. 10). For example, the action ID 906 shows that an action of the rule ID="1" corresponds to an action of the action ID="4" in the action DB (see FIG. 10). The action ID="4" in the action DB (see FIG. 10) corresponds to the action of "Get surprised".

The degree of interest (interest) 907 indicates an initial value of the degree of interest.

The interest damping rate (damping rate) 908 shows a damping rate of the degree of interest.

The rule of which rule ID="X" is a special rule that indicates the robot performs no action.

As shown in FIG. 10, items of the action DB 1000 include an action ID 1001 and an action content 1002 as well as a neck 1003, a palm 1004, a waist 1005, an arm 1006 and a mouth 1007 as examples of members of moving parts. Here, members of movable parts are, for example, the neck (head R1), the palm, the arm (arm R2), a waist (leg R3 and body R4), and a mouth (speaker S).

For example, the action ID="5" indicates that an action of "turning the face and the body toward a target and raising the hand" is carried out as a reflective action by using the head, waist and arm.

Different action IDs are assigned to the action IDs="7" and "8" respectively since each action of the action ID="7" and "8" is defined differently by a rotational angle and the degree of freedom of each joint of the arm R2 that is moved by the autonomous moving control unit 50. Here, the degree of freedom indicates, for example, actions of bending a joint in a front-back or an up-down direction or revolving a joint. Members other than the arm R2 may be set similar to the arm R2.

Different action IDs are also assigned to the action ID="9" and "10" since sound volumes of sounds synthesized by the sound synthesis unit 21a are different in the actions of the action IDs="9" and "10". Actions other than those shown in FIG. 10 may be included, which are, for example, "twisting the body at the waist", "swinging the arm", "closing and opening fingers", and "waiving goods such as a flag that the robot R grippes".

The situation DB storage means (situation data base storage means) 34 provided in the storage 30 stores the situation DB (situation data base). The situation DB stores data indicating situations that includes results of image processing or sound recognition processing as the surrounding situation. In the embodiment, the situation DB stores data indicating whether or not a battery is being recharged as data indicating an internal condition of the robot R in addition to the surrounding situation.

A specific example of the situation DB is described with reference to FIGS. 11A and 11B. FIGS. 11A and 11B are illustrations for explaining the situation DB stored in the situation DB storage means shown in FIG. 8. FIG. 11A shows examples of situation contents and their present status stored in the situation DB. FIG. 11B shows examples of content candidates to be written in the situation DB depending on the present status of the situation contents. As shown in FIG. 11A, the situation DB 1100 includes a situation ID 1101, a situation content 1102, a present state 1103 as items of a present situation. The present state 1103 indicates a present value of the situation content 1102. In this example, "On" in the present state 1103 indicates "1", and "Off" in the present state 1103 indicates "0". The object data integration unit 42 and the internal state detection unit 45 write information in the present state 1103.

More specifically, the object data integration unit 42 receives a result of image processing from the image processor 10 regarding the situations indicated by the situation IDs="0", "3" in FIG. 11A, and writes appropriate information in the situation DB based on the image processing result. The situation change detection means 110, which will be described later, detects a situation change when the object data integration unit 42 writes information in the situation DB as described above. A method for recognizing the situation "there is a person approaching" indicated by the situation ID="3" is realized, for example, by determining, based on the result of image processing of the image processor 10, whether or not the number of pixels representing a recognized face image is increased, and recognizing the situation that "there is a person approaching" when the number of pixels representing the recognized face image is increased. The object data integration unit 42 also receives data from the target detection unit 80 regarding the situations indicated by the situation IDs="1", "2", and writes appropriate information in the situation DB based on the received data. The object data integration unit 42 also writes appropriate information on the situations indicated by the situation IDs="4", "5" when a voice or a sound is input to the microphones MC, MC. The object data integration unit 42 writes appropriate information on the situation indicated by the situation ID="7" in the situation DB based on data from the sound source position determination unit 21c. The object data integration unit 42 writes appropriate information on the situation indicated by the situation ID="8" in the situation DB based on an object map stored in the object data storing means 31 (see FIG. 7). The internal state detection unit 45 writes appropriate information on the situation indicated by the situation ID="6" in the situation DB.

FIG. 11B shows schematic examples of content candidates that the action inducing parameter setting means 130 writes in a data writing area (not shown) of the situation DB. Each content written in the situation DB is associated with a situation (or a situation ID) and a selected rule (or an action ID), and includes, as information items, "Priority", "Interest" and "Damping_rate". "Priority", "Interest" and "Damping rate" described here are the same as those described in the rule DB. Body parts related to a selected rule (or an action ID) are also shown. Here, it is assumed that Rule 1 (rule ID="1") is selected firstly, and then Rule 5 (the rule ID="5", Rule 4 (rule ID="4"), Rule 6 (rule ID="6"), and the special rule X (rule ID="X") are selected sequentially in order. The special rule X is to terminate (reset) an action or a speech that have been executed so far when the present value of "Interest" (remaining interest) becomes "0". After reset, an action or a speech can be restarted in accordance with a situation at the time of restarting. In the embodiment, pausing of an action or a speech is realized for increasing diversity of actions, though the robot R is generally assumed to continue acting or speaking.

Referring back to FIG. 8, a configuration of the reflective action control unit 47 is explained below. The situation change detection means 110 detects a change in the situation DB. In the embodiment, for example, when the robot R is connected to a battery charger, the situation change detection means 110 is triggered to start a process detecting the writing of information in the situation DB as a situation change. Specifically, the situation change detection means 110 detects that the robot R is connected to a battery charger based on status information showing data on the status of the robot R (the present position, the recharging state, the remaining battery amount, the task execution status), which are detected by the internal state detection unit 45.

When the situation change detection means 110 detects the writing of information in the situation DB as a situation change, the rule detection means 120 detects a rule that is associated with the situation indicated by the data stored in the situation DB from the rule DB.

The action inducing parameter setting means 130 sets the degree of interest (action inducing parameter) contained in the detected rule in at least one of the movable parts (e.g. the neck, the palm, the waist, the arm) and the speaker S (audio output unit) in the situation DB, independently. In the embodiment, the action inducing parameter setting means 130 sets an initial value of the degree of interest contained in each detected rule in the situation DB. The action inducing parameter setting means 130 includes a priority comparing means 131, a parameter comparing means 132 and a rule changing means 133.

The priority comparing means 131 compares the degree of priority contained in the detected rule and the degree of priority contained in a rule being executed. In the embodiment, the priority comparing means 131 determines whether or not the degree of priority of the selected rule is greater than that of the rule being executed.

When the priority comparing means 131 determines that the degree of priority of the detected rule is higher than that of the rule being executed, the parameter comparing means 132 compares an initial value of the degree of interest (action inducing parameter) contained in the detected rule and the present value of the degree of interest (action inducing parameter) set in the rule being executed. In the embodiment, the parameter comparing means 132 determines whether or not the degree of interest (initial value) of the selected rule is greater than the degree of interest (present value) of the rule being executed.

When the parameter comparing means 132 determines that the degree of interest (initial value) of the selected rule is greater than the degree of interest (present value) of the rule being executed, the rule changing means 133 sets the initial value of the degree of interest contained in the detected rule (action inducing parameter) in the situation DB. In the embodiment, when the degree of interest (initial value) of the selected rule is greater than the degree of interest (present value) of the rule being executed, the rule changing means 133 sets the degree of priority, the degree of interest (initial value), the interest damping rate of the selected rule in the situation DB in place of those of the rule being executed. The rule changing means 133 sets the degree of priority, the degree of interest (initial value) and the interest damping rate of the selected rule as such at the first time of rule setting without performing other processes.

The parameter change means 140 changes the degree of interest (action inducing parameter) set for at least one of the parts in the situation DB. In the embodiment, the parameter change means 140 decreases the degree of interest (action inducing parameter) set in the situation DB by the damping rate in response to an elapsed time. More specifically, the parameter change means 140 continuously decreases the value of the degree of interest at a predetermined interval (e.g. the period of a control clock, or 1 second).

The command means 150 requests at least one of the parts in which the degree of interest (action inducing parameter) is set to execute an execution instruction indicated by the rule that is associated with the degree of interest (action inducing parameter) set in the situation DB. In the embodiment, the command means 150 outputs an action command to the gesture integration unit 44, the behavior patterning unit 43 or the audio processor 20 so that the corresponding part performs an action or a speech that is indicated by the action ID of the rule set in the situation DB. Thus, the gesture integration unit 44 executes an action (gesture) using the head R1 or the arm R2. The behavior patterning unit 43 and the audio processor 20 makes the speaker S to output information stored in the speech information storing means 35.

In the embodiment, as for a speech, the timing when the parameter change means 140 starts to decrease the value of the degree of interest is set immediately after the output of the command. As for an action, the degree of interest is maintained for a while after the output of the command and then the degree of interest is decreased. The specific example of the above process regarding an action is explained below with reference to FIGS. 12A and 12B.

Figure 12A:
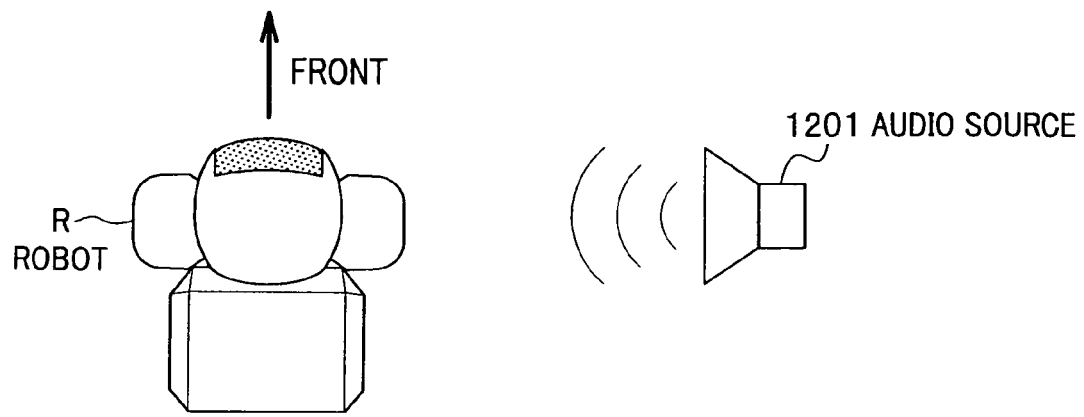
FIGS. 12A and 12B are illustrations showing an example of a timing at which the degree of interest is started to be damped.
Figure 12B:
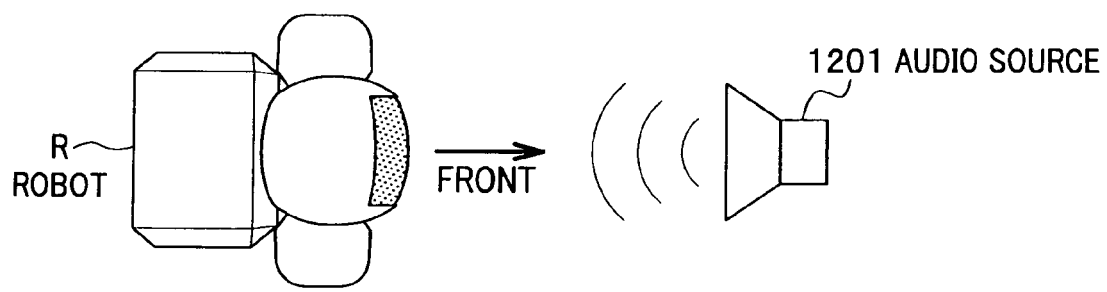

FIGS. 12A and 12B are illustrations for explaining examples of the timing for decreasing the degree of interest. FIGS. 12A and 12B are flat views seen from right above the robot R. As shown in FIG. 12A, when a large sound is generated to the right of the robot R, (situation ID="5", "12"), the action inducing parameter setting means 130 selects, for example, "When a big sound (not less than level 6) is heard, see the direction of the audio source by twisting its waist (rule ID="2")", and sets a flag indicating that the degree of interest is fixed without being changed to "On" (e.g. flag="1"). In this case, even when other movable parts are being moved, decrease of the degrees of interests for all the movable parts is preferably stopped. The action inducing parameter setting means 130 notifies the selected rule to the command means 150. The command means 150 refers to rules set in the situation DB, and outputs the rule "See the direction of an audio source by twisting its waist (action ID="3")" to the gesture integration unit 44. Thus, the robot R starts an action for turning the direction of an audio source 1201. The action inducing parameter setting means 130 then sets the degree of priority, the degree of interest (initial value) and the interest damping rate of the selected rule in the situation DB after recognizing initiation of the movement to the requested position. It should be noted that the action inducing parameter setting means 130 may set the degree of priority, the degree of interest (initial value) and the interest damping rate of the selected rule in the situation DB when the rule is selected. In an operational flow which will be described later, the action inducing parameter setting means 130 is assumed to operate in the latter described manner.

As shown in FIG. 12B, the robot R rotates to the requested position so that the robot R faces in the direction of the audio source 1201. Upon recognizing the completion of the rotational movement to the requested position, the action inducing parameter setting means 130 sets a flag indicating that the degree of interest is maintained without being changed to "Off" (e.g. flag=0). Then, the parameter change means 140 starts to decrease the degree of interest of the selected rule (rule ID="2"). Initiation or completion of the movement to the requested position may be directly notified from any one of the gesture integration unit 44, the behavior patterning unit 43 and the object data integration unit 42 to the action inducing parameter setting means 130, or may be written in the situation DB by any one of the units 42 to 44. This configuration has the following advantages. If the degree of interest starts to be decreased immediately after starting the movement, the time period in which a posture is kept after completion of the movement is changed depending on a start position of the movement. For example, the robot is rotated by 90 degrees to the requested position in the example shown in FIG. 12B, however, if the robot is to be rotated by 180 degrees to the requested position, a time period in which a posture is kept after completion of the movement becomes shorter. In the embodiment, since the value of the degree of interest can be maintained for a while after the command for the movement is output, and then the degree of interest is decreased, a predetermined time in which a posture is kept after reaching the requested position can be made relatively constant.

<Operation of Robot>

Figure 13:
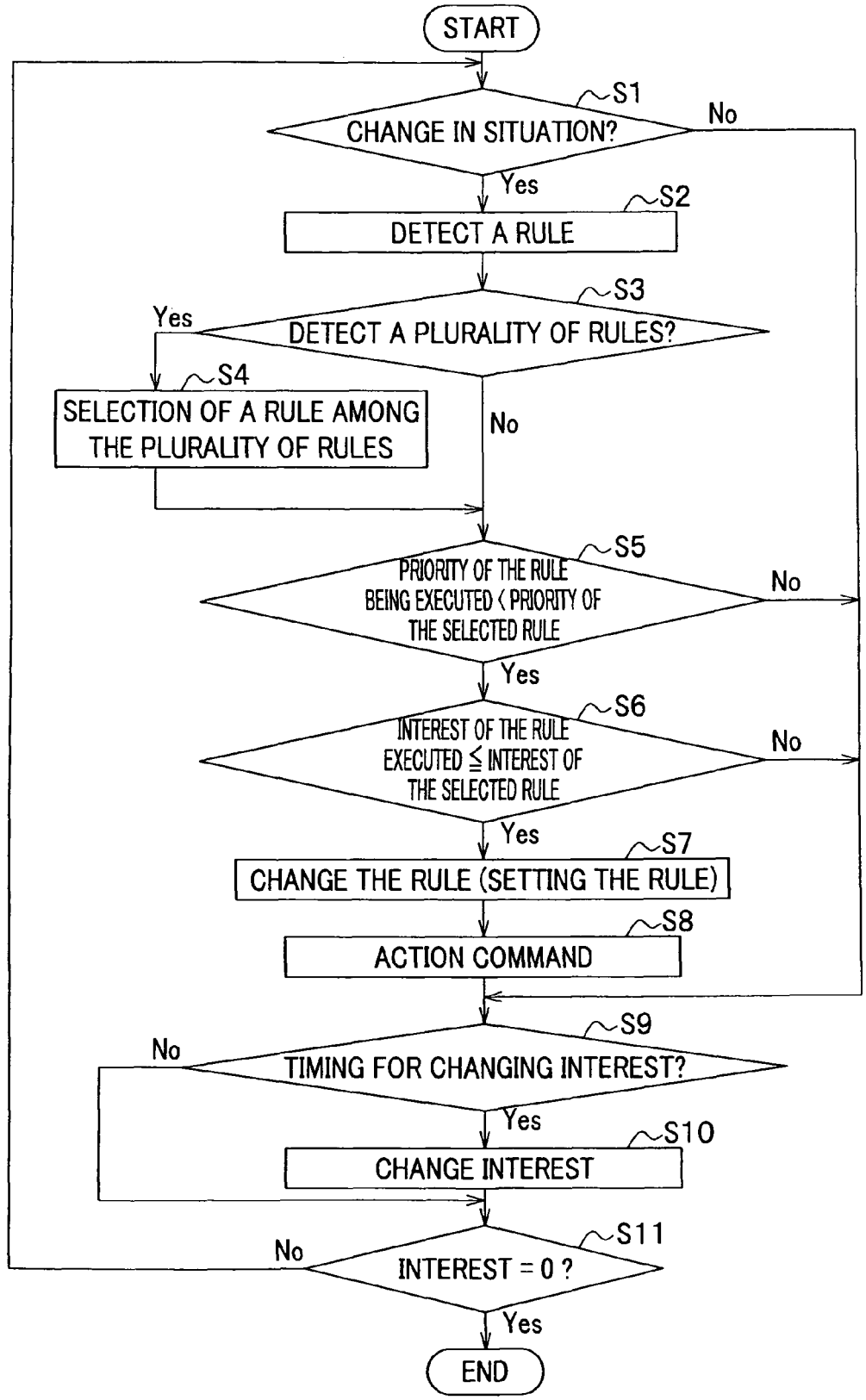
FIG. 13 is a flow chart showing an operation of the reflective action control unit shown in FIG. 7.

Operation of the robot R shown in FIG. 6 is explained focusing on the operation of the reflective action control unit 47 with reference to FIG. 13 (see FIG. 1, FIG. 6 and FIG. 7 as needed). FIG. 13 is a flow chart showing the operation of the reflective action control unit shown in FIG. 7. The reflective action control unit 47 is triggered to start a process of detecting writing of information in the situation DB as a situation change by the situation change detection means 110, for example, when the robot R is connected to a battery charger. When the reflective action control unit 47 detects writing of information in the situation DB as a situation change by the situation change detection means 110 (Step 1: Yes), the reflective action control unit 47 detects, from the rule DB, a rule that corresponds to the situation indicated by the data stored in the situation DB by the rule detection means 120 (Step 2). When the rule detection means 120 detects a plurality of rules that corresponds to the situation (Step 3: Yes), the rule detection means 120 selects one of the plurality of rules (Step 4). When the rule detection means 120 detects only one rule that corresponds to the situation (Step 3: No), the rule detection means 120 skips Step 4.

The reflective action control unit 47 then determines whether or not the degree of priority of the selected rule is greater than that of the rule being executed by the priority comparing means 131 (Step 5). When the reflective action control unit 47 determines that the degree of priority of the selected rule is greater than that of the rule being executed (Step 5: Yes), the reflective action control unit 47 determines whether or not the degree of interest (initial value) of the selected rule is greater than that (present value) of the rule being executed by the parameter comparing means 132 (Step 6). When the reflective action control unit 47 determines that the degree of interest (initial value) of the selected rule is greater than that (present value) of the rule being executed (Step 6: Yes), the reflective action control unit 47 changes the rule being executed and set in the situation DB to the selected rule by the rule changing means 133, and sets the degree of interest (initial value) of the selected rule (Step 7). The rule changing means 133 sets the selected rule without performing the above process at the first time of rule setting.

The reflective action control unit 47 outputs an action command to the gesture integration unit 44 or other appropriate units by the command means 150 so that the corresponding movable part performs an action indicated by the action ID of the rule set in the situation DB (Step 8). The reflective action control unit 47 determines whether or not the present time is the timing to change the degree of interest of the rule set in the situation DB. When the reflective action control unit 47 determines that the present time is the timing to change the degree of interest of the rule set in the situation DB (Step 9: Yes), the reflective action control unit 47 changes the value of the degree of interest by the parameter change means 140 (Step 10), and then proceeds to Step 11. On the other hand, when the reflective action control unit 47 does not determine that the present time is the timing to change the degree of interest of the rule set in the situation DB (Step 9: No), the reflective action control unit 47 skips Step 10, and proceeds to Step 11. In Step 11, when the degree of interest of the rule set in the situation DB is not determined to be 0 (Step 11: No), the reflective action control unit 47 returns to Step 1. When the degree of interest of the rule set in the situation DB is determined to be 0 (Step 11: Yes), the reflective action control unit 47 terminates the processing.

In Step 1, when the reflective action control unit 47 does not detect writing of information in the situation DB as a situation change by the situation change detection means 110 (Step 1: No), the reflective action control unit 47 proceeds to Step 9, and then changes the degree of interest if the present time is the timing to change the degree of interest. In Step 5, when the reflective action control unit 47 determines that the degree of priority of the selected rule is not greater than that of the rule being executed by the priority comparing means 131 (Step 5: No), the processing of the reflective action control unit 47 proceeds to Step 9. In Step 6, when the reflective action control unit 47 determines that the degree of interest (initial value) of the selected rule is less than that (present value) of the rule being executed by the parameter comparing means 132 (Step 6: No), the processing of the reflective action control unit 47 proceeds to Step 9.

<Example of History of Damping Rate>

Next, a specific example of a history of a damping rate is described with reference to FIG. 14 (see FIGS. 9 to 11 as appropriate). FIG. 14 is an illustration for explaining the specific example of the history of the damping rate written in the situation DB. In the following explanation of the example, it is assumed that the degrees of priorities of rules are equal and the rules are changed only once to simplify the explanation of the history of the damping rate. In the example, Rule 5 shown in FIG. 11B is selected. Since Rule 5 (rule ID="5") has the degree of interest (initial value) "80" and the interest damping rate "[1.0]", and parts used for the action associated with Rule 5 are "the neck, the waist and the arm", the degree of interest "80" and the damping rate "[1.0]" are set for "the neck, the waist and the arm", respectively at "t=0". The total column indicates the degree of interest and the damping rate of the rule. In the example, each of the neck, the waist and the arm is assumed to be positioned at a requested position at "t=0".

At "t=1", the degree of interest (initial value) is decreased by the damping rate, and the degree of interest "79" and the damping rate "[1.0]" are set for "the neck, the waist, the arm and the total", respectively. The degree of interest is decreased as time passes by, and at "t=20", the degree of interest "60" and the damping rate "[1.0]" are set for "the neck, the waist, the arm and the total", respectively. In the example, Rule 4 shown in FIG. 11B is selected at this time ("t=20"). Rule 4 (rule ID="4") has the degree of interest (initial value) "50" and the interest damping rate "[0.8]", and a part "the neck" used for the action associated with Rule 4. At this time, the rules are not changed because the degree of interest (50) of the selected rule is less than the degree of interest (60) of the rule being executed (50<60).

At "t=30", however, the rules are changed because the degree of interest (50) of the selected rule becomes equal to the degree of interest (50) of the rule being executed (50=50). Since the new rule is associated with "the neck", the degree of interest "49.2" and the damping rate "[0.8]" are set for "the neck and the total", respectively, at "t=31". On the other hand, the degree of interest "49" and the damping rate "[1.0]" are set for "the waist and the arm", respectively at "t=31". This means that "the neck" performs the action specified by the new rule, and "the waist and the arm" keeps performing the action specified by the previous rule. At "t=80", "the waist and the arm" completes the action specified by the previous rule, while "the neck" completes the action at "t=93" when the degree of interest of "the neck" becomes "0". It is to be noted that some actions are completed before the degree of interest of the actions becomes "0" depending on contents of the actions.

In accordance with the embodiment, the robot R independently sets the degree of interest of a rule detected based on a change in the situation DB to the neck, the palm, the waist, the arm, and the mouth (speaker), which are used for an action or a speech, in the situation DB. The robot R then independently changes the degree of interest set to each part. The robot R can perform an action or a speech specified by a new detected rule that is selected when the degree of interest is changed since the robot R executes an execution instruction indicated by a rule having the degree of interest set in the situation DB. Thus, the embodiment allows the robot R to have diversity in expressions of its actions.

In accordance with the embodiment, the robot R can express diverse actions depending on the time because the robot R decreases the initial value of the action inducing parameter set in the situation database at the damping rate in response to an elapsed time.

In accordance with the embodiment, the robot R changes a rule to be executed based on the priority and the value of the action inducing parameter of the rule. Thus, the robot R can express diverse actions by setting different values to the degree of priority and the initial value of the action inducing parameter of each rule.

In accordance with the embodiment, the robot R can perform diverse actions during charging without interrupting execution of a predetermined task since the robot R is triggered to start a process for detecting a change in the situation database when the robot R is connected to a battery charger.

A preferred embodiment of the present invention is described above, however, the present invention is not limited to the embodiment. For example, the rule DB in the embodiment is explained with reference to FIG. 9, however, the rule DB of the present invention is not limited to that described in FIG. 9. The rule DB 1500 shown in FIG. 15 includes, as its items, a rule ID 1501, the degree of priority (Priority) 1502, a rule condition 1503, an action ID 1504, the degree of interest (Interest) 1505, an interest damping rate (Damping_rate) 1506. Here, the rule condition 1503 indicates a condition required for a rule to be selected. The other items are the same as those described in FIG. 9. When the rule DB 1500 is employed, a rule that satisfies its rule condition becomes a selection candidate. More specifically, each rule shown in FIG. 15 has the same degree of priority. This configuration allows each rule (action) to be expressed in a random manner. As for the rules whose rule IDs="20", "21" and "22", their rule conditions are also the same. The unit of the number used in their rule conditions is millisecond. In the case described above, one of the rules whose rule IDs="20", "21", "22" and "X" is selected in a random manner during the time period of 5 to 10 seconds after people have gone from the periphery of the robot R. When 10 seconds are passed after people have gone from the periphery of the robot R, one of the rules whose rule IDs="20", "21", "22" is selected in a random manner. By providing the degree of interest and the interest damping rate to the rule "Doing nothing", it is possible to set the degree of interest of the rule "Doing nothing" to the total column of the situation DB when the rule "Doing nothing" is selected, which allows to prevent the robot R from performing any action. The rule DB and the action DB can be readily edited, and thus the degree of interest can be easily changed by editing the rule DB and the action DB. It is also possible to edit the rule DB and the action DB so that parts are moved in the order of a part having the shortest travel distance to a part having the longest travel distance. The rule condition may be set to indicate the first start time or the last start time of random actions.

In the embodiment, five rules are illustrated in FIG. 11B, and the five rules are set independently from each other. The degree of interest (action setting parameter) of each rule is set for each part independently, and the degree of interest in each part is also decreased independently. Thus, a plurality of rules can be executed at the same time, allowing actions using different parts to be executed simultaneously. In the following explanation, it is assumed that the degrees of priorities of a plurality of rules shown in FIG. 11B are the same. In this case, when Rule 1 is detected by generation of a large sound during a breathing-like action performed based on Rule 6, only the neck of the robot R can be rotated toward the audio source with the other parts being kept moving based on Rule 6, depending on the degree of interest of the action. Furthermore, when other rules are detected during the breathing-like action, a start of a next action can be implied in advance by changing the rhythm of the breathing. This allows the robot R to express more natural actions.

The parameter changing means 140 may change the damping rate of a rule stored in the rule DB depending on the number of times the rule is executed. This enables to set the damping rate of a rule based on a history of a speech or an action of the rule. For example, if the damping rate of a rule is set to be greater as the number of times the rule is executed is increased, the time period can be made shorter in which a speech or an action of the rule is expressed. In this case, rules that are executed will be more diversified in a given time period compared with the case in which the damping rate of the rule is not changed. The damping rate of a rule may be set smaller as the number of times the rule is executed is increased, assuming that the rule performed many times executes a highly evaluated action or speech in communication with people. By editing the rule DB as described above, the time period of rules executed more times can be made longer and that of rules executed less times can be made shorter.

The degree of interest or a damping rate may be multiplied by a predetermined value that is set for each robot R based on the status information (the present position, the charging condition, the remaining battery level, and the task execution status) or the learning condition (the amount of information received from the management computer 3 or information acquired through communication) of the robot R. This allows for setting the diversity of actions expressed by the robot R differently by each robot R, whereby each robot R can exhibit different diversity in expression of actions just as each human being has a different character. Thus, people can have a sense of closeness to the robot R easily.

In the embodiment, the robot R includes the situation DB storing means 34 which exclusively stores the situation DB, however the situation DB storing means 34 may be integrated with the object data storing means 31 which stores the object map. The object map is data that records object data by each object and time-instant, and thus a part of the object map can be used as the situation DB.

In the embodiment, the action DB 1000 includes, as the movable parts expressing an action of the robot R, the neck, the palm, the waist, the arm and the mouth (speaker), however, a finger, a shoulder and a leg may also be included. Moreover, these parts may be defined more segmented.

In the embodiment, a reflection action while the robot R is connected to a battery charger for the battery 70 (i.e. the robot R is not executing any task) is described as an example, however, the reflection action can be executed while the robot R is executing a task. For example, when the robot R is addressed by a person passing the robot R while the robot R is walking executing the transportation task according to the delivery module, the robot R can reply to the person saying "Yes" or "I can not reply to you while delivering".

In the embodiment, the robot R is the autonomously-movable robot capable of two-leg walk, however, the present invention is not limited to this, and may be applied to an autonomously-movable robot that can move by its wheels. The autonomously-movable robot that can move by its wheels according to the present invention must have the same advantages as that of the robot R in the embodiment, except that its movable parts that corresponds to "legs" of the robot R are "wheels".

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A communication robot comprising:
an external information acquiring unit for acquiring external information indicating a surrounding situation;
an audio output unit for outputting a sound based on speech information; and
a plurality of movable parts, each of which performs an action recognizable to a communication target,
the communication robot further comprising:
a situation database storing unit for storing a situation database which stores first data indicating a situation and second data related to operations of the audio output unit and the plurality of movable parts, the first data including the external information acquired by the external information acquiring unit which indicates the surrounding situation;
a main controller which writes information in the situation database;
a rule database storing unit for storing a rule database which includes a plurality of rules, each having
an execution command of at least one of a speech and an action corresponding to the situation and
an action inducing parameter which is related to an expression of the at least one of the speech and the action indicated by the execution command;
a situation change detection unit for detecting writing of information by the main controller into the situation database as a situation change;
a rule detection unit for detecting, from the rule database, a rule corresponding to the situation indicated by the first data stored in the situation database when the writing of information by the main controller into the situation database is detected by the situation change detection unit;
an action inducing parameter setting unit for setting, as the second data stored in the situation database, the action inducing parameter contained in the rule to at least one of the movable parts and the audio output unit independently;
a parameter changing unit for independently changing the action inducing parameter which has been set for the at least one of the movable parts and the audio output unit as the second data stored in the situation database; and
a command unit for requesting the at least one of the movable parts and the audio output unit to execute the execution command indicated by the rule which includes the action inducing parameter set in the situation database,
wherein each of the plurality of rules stored in the rule database includes an initial value and a damping rate of the action inducing parameter,
the action inducing parameter setting unit sets the initial value of the action inducing parameter contained in the rule in the situation database, and
the parameter changing unit decreases the initial value of the action inducing parameter set in the situation database according to the damping rate in response to an elapsed time.

2. The communication robot according to claim 1, wherein the parameter changing unit changes the damping rate of any one of the plurality of rules stored in the rule database depending on the number of times the any one of the plurality of rules is executed.

3. The communication robot according to claim 2, wherein the rule database includes a priority level in each of the plurality of rules, and the action inducing parameter setting unit includes:
a priority level comparing unit for comparing the priority level contained in the rule and the priority level contained in a currently executing rule,
a parameter comparing unit for comparing the initial value of the action inducing parameter contained in the rule and a present value of the action inducing parameter contained in the currently executing rule when the priority level contained in the rule is greater than the priority level of the currently executing rule, and
a rule changing unit for setting the initial value of the action inducing parameter contained in the rule in the situation database when the initial value of the action inducing parameter contained in the rule is equal to or greater than the present value of the action inducing parameter of the currently executing rule.

4. The communication robot according to claim 3, wherein the situation database stores, as data indicating internal status of the communication robot, data indicating whether or not a battery of the communication robot is under charging, and the situation change detection unit is triggered to start a process for detecting a change in the situation database when the communication robot is connected to a battery charger.

5. The communication robot according to claim 2, wherein the situation database stores, as data indicating internal status of the communication robot, data indicating whether or not a battery of the communication robot is under charging, and the situation change detection unit is triggered to start a process for detecting a change in the situation database when the communication robot is connected to a battery charger.

6. The communication robot according to claim 1, wherein the rule database includes a priority level for each of the plurality of rules, and the action inducing parameter setting unit includes:

a priority level comparing unit for comparing the priority level contained in the rule and the priority level contained in a currently executing rule, a parameter comparing unit for comparing the initial value of the action inducing parameter contained in the rule and a present value of the action inducing parameter contained in the currently executing rule when the priority level contained in the rule is greater than the priority level of the currently executing rule, and a rule changing unit for setting the initial value of the action inducing parameter contained in the rule in the situation database when the initial value of the action inducing parameter contained in the rule is equal to or greater than the present value of the action inducing parameter of the currently executing rule.

7. The communication robot according to claim 6, wherein the situation database stores, as data indicating internal status of the communication robot, data indicating whether or not a battery of the communication robot is under charging, and the situation change detection unit is triggered to start a process for detecting a change in the situation database when the communication robot is connected to a battery charger.

8. The communication robot according to claim 1, wherein the situation database stores, as data indicating internal status of the communication robot, data indicating whether or not a battery of the communication robot is under charging, and the situation change detection unit is triggered to start a process for detecting a change in the situation database when the communication robot is connected to a battery charger.

* * * * *